(12) United States Patent
Basfar et al.

(10) Patent No.: US 8,663,722 B2
(45) Date of Patent: Mar. 4, 2014

(54) REMOVAL OF PESTICIDE RESIDUES IN FOOD BY IONIZING RADIATION

(71) Applicant: King Abdulaziz City for Science and Technology, Riyadh (SA)

(72) Inventors: Ahmed Ali Basfar, Riyadh (SA); Khaled Abdel-Aziz Mohamed, Riyadh (SA)

(73) Assignee: King Abddulaziz City for Science and Technology, Riyadh (SA)

( * ) Notice: Subject to any disclaimer, the term of this patent is extended or adjusted under 35 U.S.C. 154(b) by 0 days.

(21) Appl. No.: 13/743,340

(22) Filed: Jan. 17, 2013

(65) Prior Publication Data

US 2013/0129877 A1 May 23, 2013

Related U.S. Application Data

(62) Division of application No. 12/818,197, filed on Jul. 23, 2010, now Pat. No. 8,476,482.

(51) Int. Cl.
*A23L 1/00* (2006.01)

(52) U.S. Cl.
USPC .......................................... 426/286; 588/402

(58) Field of Classification Search
USPC ........... 426/286; 588/306, 307, 402, 405, 408
See application file for complete search history.

(56) References Cited

U.S. PATENT DOCUMENTS

| 5,232,484 A | 8/1993 | Pignatello |
| 2007/0281046 A1 | 12/2007 | Wen et al. |
| 2009/0107919 A1 | 4/2009 | Burba, III et al. |

OTHER PUBLICATIONS

Sonja Solar et al., Oxidation of 2,4-dichlorophenoxyacetic acid by ionizing radiation: degradation, detoxification and mineralization,Radiation Physics and Chemistry, 2003, 137-143, vol. 66.

A.A. Basfar et al., Radiolytic degradation of malathion and lindane in aqueous solutions, Radiation Physics and Chemistry, Jun. 3, 2009,pp. 994-1000, vol. 78, Issue 11.

A.A. Basfar et al.,Gamma-ray induced degradation of diazinon and atrazine in natural groundwaters, Journal of Hazardous Materials,2009, pp. 810-814, vol. 166.

Francois L. Lepine, Effects of ionizing radiation on pesticides in a food irradiation perspective: a bibliographic review,Journal of Agricultural and Food Chemistry, 1991, pp. 2112-2118, vol. 39, Issue 12.

Yzng-Kal Fu,Food Irradiation Studies at the Institute of Nuclear Energy Research, Taiwan, Rep. of China, Radzat Phys Chera,1981, pp. 539-554, vol. 18, issue No. 3-4.

Marek Trojanowicz et al., Monitoring of toxicity during degradation of selected pesticides using ionizing radiation, Chemosphere, 2004, 135-145, vol. 57.

A. E. Carp et al., Decomposition of Aldrin by Gamma Radiation II in Lipid Solutions,Purdue Agricultural Experiment Station, Journal Paper No. 4197.

M. Lacroix et al. Using gamma irradiation for the recovery of anthocyanins from grape pomace, Radiation Physics and Chemistry, 2000, pp. 277-279, vol. 57.

H. Auda et al. Studies on Sprout Inhibition of Potatoes and Onions and Shelf-Life Extension of Dates in Iraq, Radiation Physics and Chemistry, pp. 775-781, vol. 14.

M. Al-Bachir, Effect of gamma irradiation on storability of two cultivars of Syrian grapes (*Vitis vinifera*), Radiation Physics and Chemistry,1999, pp. 81-85, vol. 55.

*Primary Examiner* — Edward Johnson
(74) *Attorney, Agent, or Firm* — Raj Abhyanker, P.C.

(57) ABSTRACT

The present disclosure relates to a process for removal of pesticide residues from aqueous solutions and food products by ionizing radiation. Standard pesticides concentrations recognized by international organizations as maximum residues limit (MRLs) were used as the targeted concentrations in both aqueous solutions and food products. Commercially known pesticides and recommended irradiation doses by International Atomic Energy Agency (IAEA) were selected for this investigation. Aqueous solutions and food products fortified with pesticide residues were subjected to selected doses of ionizing radiation. Radiation-induced removal of pesticide residues is generally greater in aqueous solutions than in food products. Ionizing radiation can reduce the residues of pirimiphos-methyl in potatoes, grapes and dates; malathion and cypermethrin in grapes to below MRLs at the recommended irradiation doses.

12 Claims, 5 Drawing Sheets

REMOVAL OF PESTICIDE RESIDUES IN FOOD BY IONIZING RADIATION

CLAIM OF PRIORITY

This application is a divisional application of U.S. patent application Ser. No. 12/818,197 titled REMOVAL OF PESTICIDE RESIDUES IN FOOD BY IONIZING RADIATION filed on Jul. 23, 2010.

FIELD OF THE INVENTION

The present disclosure relates to a process to remove pesticide residues remaining in the matrix of some vegetables and/or fruits by ionizing radiation.

BACKGROUND

Pesticides are used for controlling insects, weeds, fungi, and/or other pests which destroy agricultural crops. Pesticides are widely used in fruits and vegetables because of their susceptibility to insect and disease attacks. Widespread use of pesticides in commercial agriculture has led to an increase in farm productivity.

The rapid development of agriculture in Saudi Arabia has resulted in a marked increase in the use of pesticides in agriculture. Among commercial pesticides, organophosphorus (OPs) and synthetic pyrethroid are widely applied on vegetables and fruits to control pests infestation.

Since pesticides are potentially harmful to the environment and consequently to human beings through the consumption of pesticide contaminated food, governments and international organizations established maximum residue limits (MRLs), based on the assumption that good agricultural practices are applied in the use of pesticides in farming, for pesticide residues in foodstuff (standard authority such as Codex Alimentarius Commission™ 2009 and World Health Organization™). When these chemical compounds are applied according to good agricultural practices, MRLs are not exceeded, but their incorrect application may leave harmful residues, which involve possible health risk and environmental pollution. Therefore, residues of pesticides in food products can affect the ultimate consumers especially when these products are freshly consumed.

TABLE A

Maximum Residue Limits (MRLs) in mg kg$^{-1}$ (ppm) for targeted pesticide residues in/on selected food products.

| Targeted pesticide | Maximum residue limits (MRLs) | | | |
| --- | --- | --- | --- | --- |
| | Potatoes | Onions | Grapes | Dates |
| Malathion | 0.5 | 8 | 8 | 8 |
| Pirimiphos-methyl | 0.05 | 1 | 1 | 0.1 |
| Cypermethrin | 0.05 | 0.1 | 2 | Zero |

(Source: Codex Alimentarius Commission ™)

The total dietary intake of pesticide residues which remain on agricultural commodities are known as carcinogens (Cabello G et al. 2001 and Mills P et al. 2005) and are very harmful toxins because of their potential long-term adverse affects (Bolognesi C, Morasso G 2000).

Residual pesticides on fresh vegetables and fruits decrease by various culinary applications or with time, depending on the type and properties of the pesticides. Several investigators have found that levels of some pesticide residues were reduced by the pre-harvest intervals and/or culinary application, such as washing, peeling, cooking, boiling and storage (Cengiz M et al. 2007).

Moreover, these techniques in some cases are unsuitable for removal of residual pesticides adhering to surfaces of vegetables and fruits and/or present in plant tissues (Sances F et al. 1992).

Ionizing radiation (gamma-ray, x-ray and electron beam) is an important technology in food industry for preservation of a variety of fruits and vegetables (CAST, 1996). Low doses of ionizing radiation up to 1 kGy can inhibit sprouting in potatoes (Auda H, Khalaf Z 1979), onions (Elias P, Cohen A 1983); control the insects in dry fruits like dates (Azelmat K et al. 2006) and improve the storability of grapes (Al-Bachir M 1999). Irradiation doses below 2 kGy have been used to prolong shelf-life of fruits (Al-Bachir M 1999).

Medium doses (2-7 kGy) can improve technological properties of grapes (increase juice yield) and enhance anthocyanin extraction from grapes (Ayed N et al. 2000).

However, depending on the level of security required in commercial operations, fruits can receive up to three times the minimum absorbed dose for disinfestations (Hallman G 2001). On this basis, irradiation to 4-6 kGy can be used for decontamination (and disinfestation) in commercial processing of dates and can replace the currently established practice of fumigation with highly toxic chemicals (Grecz N et al. 1988).

TABLE B

Absorbed doses accepted in USA by the Food and Drug Administration ™ (FDA).

| Product | Approved use | Dose (kGy) |
| --- | --- | --- |
| White potatoes | Sprout inhibition | 0.05-0.15 |
| Fruits | Disinfestations; ripening delay. | 1 (maximum) |
| | Improving technology properties (Grapes) | 2-7 |
| Vegetables, fresh | Disinfestations | 1 (maximum) |

Ionizing radiation from electron beam accelerators or gamma ray sources is an efficient process for oxidation removal of organic pollutants. Compared to other Advanced Oxidation Process (AOPs), this technique has the advantage that no chemicals have to be added to the treated product. In addition, an alternative technique for the treatment of the wastewater is electron beam irradiation in combination with other conventional treatment methods. In the electron beam process, the organic materials react with the radicals generated by water radiolysis and the degradation products can be easily removed by conventional biological or chemical treatment (Pikaev A et al. 1997).

Irradiation of water by high-energy electrons or gamma rays results in the formation of two reducing species, the aqueous electron $e^-_{aq}$, and the hydrogen atom, H., and one oxidizing species, the hydroxyl radical, .OH, according to Equation 1 (Spinks J, woods R 1990).

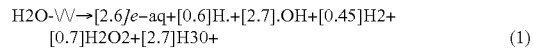

$$H_2O\text{-}\mathcal{W}\rightarrow [2.6]e\text{-aq}+[0.6]H.+[2.7].OH+[0.45]H_2+[0.7]H_2O_2+[2.7]H_3O+ \quad (1)$$

The number in brackets in Equation 1 is referred to as G values and are the number of radicals, molecules, or ions that are formed (or destroyed) in a solution absorbing 100 eV (energy). The effectiveness of this process in destroying organic compounds results from the rapid reaction of one or more of these species with the solute of interest.

The chemistry that is of principal importance with respect to the gamma radiolysis or electron beam processes in aqueous solutions and/or in food products is related to these three reactive species (i.e. e–aq, H. and .OH).

The major reaction in the water radiolysis involve the formation of e–aq, .OH and H. and in the presence of oxygen also O2.-, reactive intermediate, for example the reaction of e–aq and H. with $O_2$ is rapid and results in the formation of the super oxide ion-hydroxyl radicals according to Equations 2 and 3 (Cooper J et al. 1993).

$$e–aq + O2 \rightarrow O2.- \qquad (2)$$

$$H. + O2 \rightarrow HO2. \qquad (3)$$

The effects of ionizing radiation on pesticides in aqueous solutions or in organic solvents are reviewed by many researchers (Abdel Aal E et al. 2001, Basfar A et al. 2007, Basfar A et al. 2009, Drzewicz P et al. 2004, Drzewicz P et al. 2004, Mohamed K et al. 2009 and Varghese R et al. 2006), but limited investigations of this nature have been performed for irradiated food (Bachman S, Gieszczynska J 1982, Carp A et al. 1972, Carp A et al. 1972, Cichy R et al. 1979, Cin D, Kroger M 1982, Lan R at al. 1976, Lepine F 1991 and Solar J et al. 1971).

Fruits and vegetables form an important component of human diet. Being rich sources of vitamins and minerals, fruits and vegetables add quality to human diet and increase its nutritive value. For these reasons they have also been termed as protective foods. The water activity in most fruits and vegetables is very high. Therefore, most fruits and vegetables are highly perishable. Fruits and vegetables play host to several micro-organisms and insect pests, supporting their growth and proliferation. Often fruits and vegetables harbor pathogens and parasites that may endanger human health. They may also harbor insect's pests of quarantine importance resulting in trade restrictions in export markets. They may be also contaminated with pesticides because of the environmental and processing conditions under which they are produced.

Therefore, before they can be safely incorporated into other food products, the pesticides load should be reduced. Because "thermal treatment" can cause significant loss of flavor and aroma, a "cold process", such as irradiation, is ideal. Research over the past 40 years has shown that irradiation can be used to destroy insects and parasites in grains, dried beans, dried fruits and vegetables; to inhibit sprouting in crops such as potatoes and onions; to delay ripening of fresh fruits and vegetables; to increase juice yield, and for improvement of re-hydration. Moreover, food is irradiated to provide the same benefits as when it is processed by heat, refrigeration, freezing or treated with chemicals to destroy insects, fungi or bacteria that cause food to spoil or cause human disease and to make it possible to keep food longer and in better condition in warehouses and homes. Irradiation has been proposed as an alternative to chemicals and other conventional treatments. It is interesting to notice that the pre-harvest pesticides will still be used and their chemical interaction with irradiation is unknown. Therefore, there is a chance that irradiation may decontaminate pesticides residues in selected food products.

vegetables and fruits by ionizing radiation. In another embodiment, the fruits and vegetables are exposed to radiation ranging from 150 to 7000 Gy to remove the pesticides. This procedure may help preserve the quality of fruits and vegetables.

According to another embodiment, the removal of pesticides is done in aqueous solutions. In other embodiments, the process of AOPs, which involve oxidation of pesticides by .OH radicals, such as radiolysis by gamma-rays, that provide novel degradation methods to remove the pesticides may be used. Ionizing radiation from electron beam accelerators or gamma ray sources is considered to be an efficient process for oxidation removal of pesticides.

In one or more embodiments, pesticides Malathion, Pirimiphos-methyl and Cypermethrin reduction level are measured as a result of irradiation of vegetables and fruits. In another embodiment, a method of removing pesticide residues from vegetables and fruits by subjecting them to radiation to improve food quality and food safety may be used.

According to some embodiments vegetables such as potatoes and onions are irradiated and level of pesticides such as Malathion, Pirimiphos-methyl and Cypermethrin are measured.

According to some embodiments, fruits such as dates and grapes are irradiated and level of pesticides such as Malathion, Pirimiphos-methyl and Cypermethrin are measured.

According to some embodiment, the level of pesticides were measured to determine if they were lower than the MRLs.

SUMMARY

Figure 1:
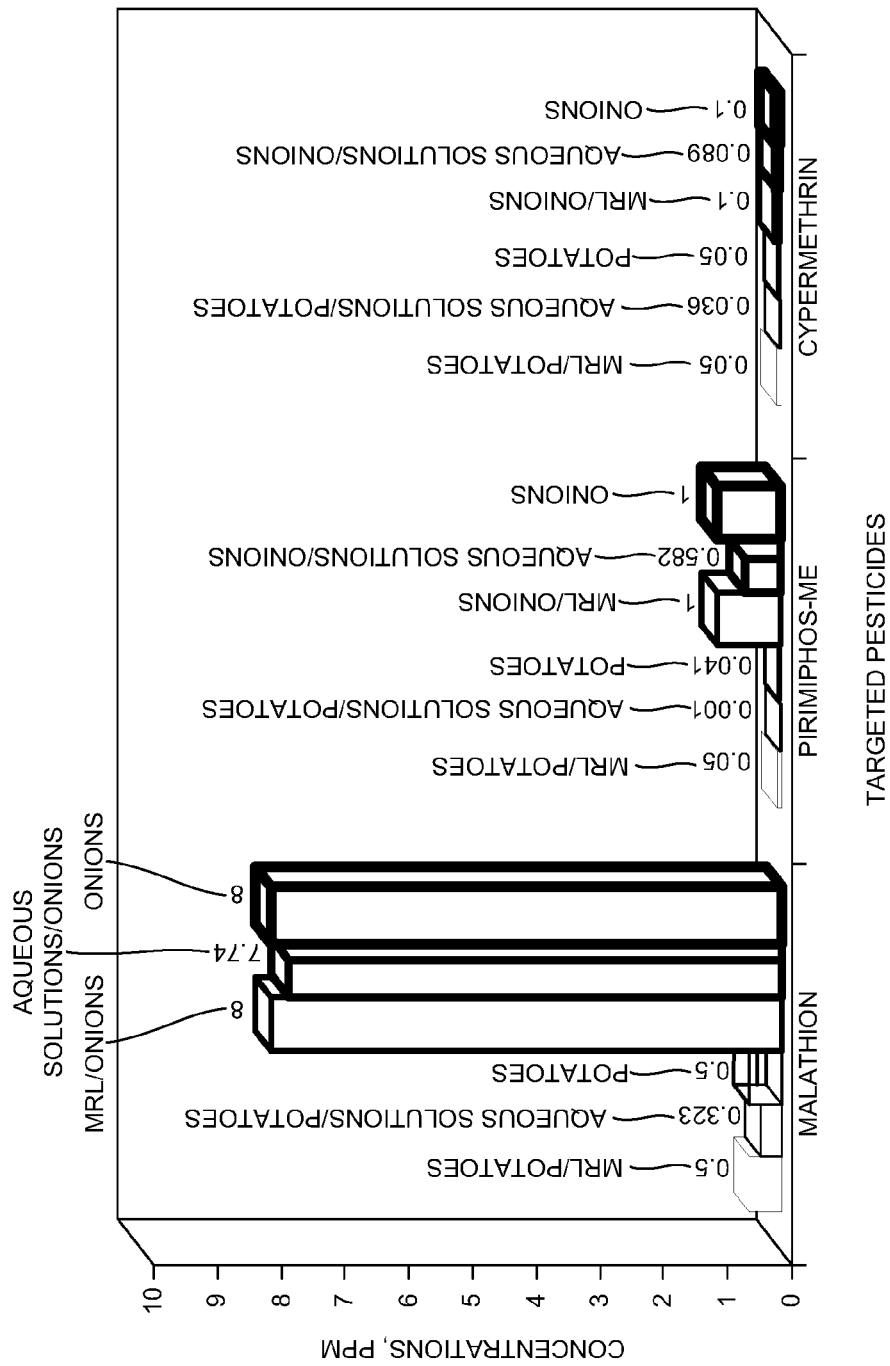
FIG. 1 shows removal rates of targeted pesticides at selected concentrations in distilled water and investigated vegetables at an absorbed dose of 1000 Gy according to a method of Table 2.

Embodiments of the present invention relate to a process for removing pesticide residues remaining in some kinds of

DETAILED DESCRIPTION

Pesticides reference materials (purity >98%) were purchased as individual standards from Dr. Ehernstorfer (Augsburg, Germany). Chemical structure, trade and chemical names (IUPAC) as well as family and action used for selected pesticides are as follows:

Malathion: Insecticide/acaricide (Organophosphate group).

O,O-dimethylphosphorodithioate, diethyl-mercaptosuccinate.

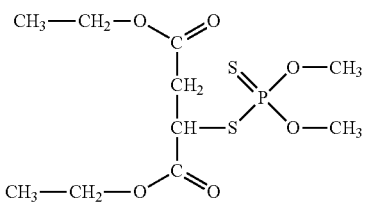 [SMILES: CCOC(=O)CC(SP(=S)(OC)OC)C(=O)OCC]

Pirimiphos-methyl: Insecticide (Organophosphate group).

O-(2-diethylamino-6-methylpyrimidin-4-yl) O,O-methyl phosphorothioate.

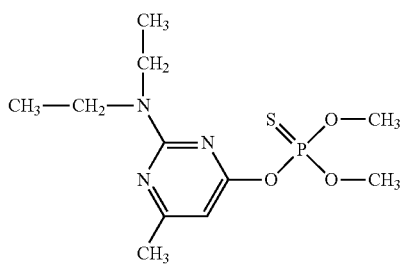 [SMILES: CCN(CC)c1nc(C)cc(OP(=S)(OC)OC)n1]

Cypermethrin: Insecticide (Synthetic pyrethroids group).

(RS)-α-cyano-3-phenoxybenzyl (1RS,3RS;1RS,3SR)-3-(2,2-dichlorovinyl)-2,2-methylcyclopropanecarboxylate.

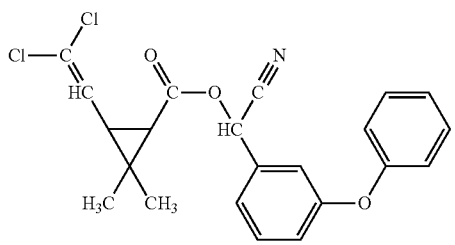 [SMILES: CC1(C)C(C=C(Cl)Cl)C1C(=O)OC(C#N)c1cccc(Oc2ccccc2)c1]

Organic solvents (residue analysis grade) for dissolving, extracting and clean-up were acetone, ethanol, diethyl ether and petroleum ether purchased from Merck (Germany) and Aldrich (UK). Anhydrous sodium sulfate, sodium chloride and sodium hydrogen carbonate and florisil (80-120 mesh) were obtained from Sigma (UK). Pesticides aqueous solutions were prepared in doubly distilled water further purified by Barnstead E-pure system (USA).

TABLE C

List of chemicals used in this invention.

| No. | Chemical | Source |
|-----|----------|--------|
| 1 | Acetone | Sigma-Aldrich, UK. |
| 2 | Acetonitrile | Merck, Germany. |
| 3 | Anhydrous sodium sulfate | Sigma, UK. |
| 4 | Cypermethrin standard | Ehernstorfer Quality (EQ), Augsburg, Germany. |
| 5 | Double distilled water | Barnstead E-pure system (USA) |
| 6 | Dichloromethane | Sigma-Aldrich, UK. |
| 7 | Diethyl ether | Sigma-Aldrich, UK. |
| 8 | Ethanol | Sigma-Aldrich, UK. |
| 9 | Ferrous ammonium sulfate | Sigma-Aldrich, UK. |
| 10 | Florisil (80-120 mesh) | Sigma-Aldrich, UK. |
| 11 | Hexane | Sigma-Aldrich, UK. |
| 12 | Malathion standard | Ehernstorfer Quality (EQ), Augsburg, Germany. |
| 13 | Petroleum ether (40-60) | Sigma-Aldrich, UK. |
| 14 | Pirimiphos-methyl standard | Ehernstorfer Quality (EQ), Augsburg, Germany. |
| 15 | Sodium chloride | Sigma-Aldrich, UK. |
| 16 | Sulfuric acid | Sigma-Aldrich, UK. |

Stock standard solutions were prepared by exact weighing of pesticide reference material and dissolution in acetone. Working standard solutions of pesticides for monitoring and irradiation studies were freshly prepared by appropriate dilution with acetone. Stock standard solutions and working standard solutions were stored under refrigeration at 4° C. (1 month of maximum storage time).

A Cobalt-60 gamma rays radiation source was used for all irradiation studies. A Gamma Cell 220 (MDS Nordion, Canada) was calibrated using aqueous ferrous sulfate (Fricke dosimetry) solution (ASTM Standard Practice E1026, 1997). The typical dose rate was 14.52 kGy $h^{-1}$ and transit dose was estimated to be 5.86 Gy $sec^{-1}$. All of the irradiations were conducted at room temperature, 23° C.

A Shimadzu 2010 series GC with QP2010 mass spectrometer and HP-5 capillary column (Hewlett Packard, 30 m, 0.25 mm I.D., 0.25 μm film thickness) was used for gas chromatography analysis. The helium carrier gas velocity was 40 cm/s, high pressure injection was set at ON and high pressure and injection pressure were set at 250 kPa. The temperatures of injector, ion source and interface were set at 250° C., 200° C. and 250° C., respectively and the oven program was 2 minutes at 80° C., 20° C./minute to 180° C. (2 minutes) and 5° C./minute to 250° C. (5 minutes). Ions were formed for mass spectrometric detection using ion electron impact ionization (EI+) mode scan. EI+ mass spectra database searches were carried out using the Wiley Registry of Mass Spectral Data, and the NIST Mass Spectral Search Program.

Aqueous solutions samples were analyzed according to the official method adopted by (EPA, 1980 and Letizia et al., 1992). On the other hand, general official multi-residues analysis methods approved by federal agencies and organizations (Anonymous, A.O.A.C. Official Methods of Analysis, 2000) for analysis of pesticides residues in fresh vegetables and fruits samples were implemented (monitored and irradiated). Gas chromatography in combination with mass selective detector (MSD) was used for the parent compound analysis (identification and quantification) under the same mentioned conditions.

Recovery experiments were conducted in both aqueous solutions and considered food products. Malathion (0.5, 4 and 8 ppm), pirimiphos-methyl (0.05, 0.1, 1 and 2 ppm) and cypermethrin (0.05, 0.1 and 2 ppm) were introduced in small volume of acetone into the distilled water to prepare the desired concentrations. Check vegetables and fruits samples (i.e. potatoes, onions, grapes and dates) were thoroughly individually mixed to obtain homogeneous samples. A malathion, pirimiphos-methyl and cypermethrin (0.05 to 0.5 ppm) were introduced in small volume of acetone into the center of the check samples to prepare the desired two concentrations. Then, the fortified vegetables and fruits samples were analyzed and the recovery percentages were calculated. The same extraction procedures and GC-MS conditions as applied for samples analyses were used for recovery studies. The recovery of these procedures for malathion, pirimiphos-methyl and cypermethrin pesticides was no less than 90% (distilled water experiments) and 75% (selected vegetables and fruits).

A total of 150 samples of different kinds of fresh fruits (grapes and dates) and vegetables (potatoes and onions) were collected at random from a local supermarkets and/or grocery markets in Riyadh, Saudi Arabia during January to September. The samples taken included: 90 samples of fruits and 60 samples of vegetables. Collected samples were subjected to analysis and detection for considered pesticide residues using Gas Chromatography-Mass Spectrometer (GC-MS).

The invention involves a method for removal of pesticide residues in vegetables and fruits. Chromatographic standard solutions of the malathion, pirimiphos-methyl and cypermethrin pesticides (100 ppm in acetone) were diluted to prepare the desired concentrations of considered pesticide solutions in distilled water at 0.5 and 8 ppm (malathion), 0.05, 0.1 and 1 ppm (pirimiphos-methyl) and 0.05, 0.1 and 2 ppm (cypermethrin), then the diluted concentrations solutions were placed in 40 ml vials having airtight caps with teflon based silicon septa. On the other hand, collected vegetables (potatoes and onions) and fruits (grapes and dates) samples were coarsely ground individually in a food chopper to prepare required samples. Pesticide standard solutions in acetone were introduced individually at desired concentrations into the center of the targeted vegetables and fruits samples in each vial. Moreover, samples were thoroughly mixed to obtain homogeneous samples. Moreover, the prepared aqueous solutions and fortified samples of vegetables and fruits were irradiated in vials at selected absorbed doses over the range 150-7000 Gy using $^{60}$Co gamma-rays. Therefore, the removal percent of pesticides in aqueous solutions and selected food products by gamma irradiation was calculated with different initial concentrations of considered pesticides in relation with different absorbed doses.

It is important to mention that the pesticide concentrations were selected based on maximum residue limits (MRLs) for targeted pesticides in selected vegetables and fruits. In addition, absorbed doses were selected based on accepted absorbed doses in USA by the Food and Drug Administration. The following examples further illustrate the present invention.

EXAMPLES

Example 1

Market Basket Survey

The pesticide residues detected in selected vegetable and fruit samples are shown in Table 1.

TABLE 1

Pesticide residues range detected in selected vegetables and fruits.

| Food product | No. of samples | Detected pesticide | Positive samples No. | Positive samples % | Residues range (mg kg$^{-1}$) | MRL (mg kg$^{-1}$) |
|---|---|---|---|---|---|---|
| Potatoes | 30 | Malathion | 3 | 20 | 0.031-0.072 (0.048$^a$) | 0.5 |
|  |  | Pirimiphos-Me | 2 |  | 0.018-0.025 (0.022$^a$) | 0.05 |
|  |  | Cypermethrin | 1 |  | NDL-0.017$^b$ | 0.05 |
| Onions | 30 | Cypermethrin | 1 | 3.33 | NDL-0.02$^a$ | 0.1 |
| Dates | 60 | NDL | 0 | 0 | NDL | NR |
| Grapes | 30 | NDL | 0 | 0 | NDL | NR |

The numbers in parenthesis represent the residues average.
NDL: no detectable level; NR: not reported.
$^a$amount monitored in potatoes/onions pulp.
$^b$amount monitored in potatoes peel.

As shown in Table 1, out of the 150 investigated samples, 143 (95.3%) showed no pesticide residues while 7 (4.7%) contained residues below MRLs. Therefore, no samples contained pesticide residues above MRLs. In three samples of potatoes, malathion, pirimiphos-methyl and cypermethrin residues were detected with average concentrations of 0.048, 0.022 and 0.017 ppm, respectively. One sample of onions contained 0.02 ppm of cypermethrin, and no samples of grapes and dates contained residues of investigated pesticides under detection limits.

Example 2

Irradiation of Aqueous Solutions

Removal (%) of pesticides in aqueous solutions at various absorbed doses is shown in Table 2.

TABLE 2

Removal (%) of pesticides in aqueous solutions at various absorbed doses.

| Initial concentrations (ppm) | Targeted pesticides | | |
|---|---|---|---|
|  | Malathion (%) | Pirimiphos-Me (%) | Cypermethrin (%) |
| 0.05 | NT | 52$^a$, 74.2$^b$, 95$^c$, 100$^d$, NT$^{e,f}$ | 0$^a$, 8.6$^b$, 13.8$^c$, 28.4$^d$, NT$^{e,f}$ |
| 0.1 | NT | 38$^a$, 46$^b$, 77$^c$, 96.6$^d$, N.T$^{e,f}$ | 0.0$^a$, 5$^b$, 7$^c$, 11$^d$, NT$^{e,f}$ |
| 0.5 | 3.4$^a$, 10.4$^b$, 21$^c$, 35.4$^d$, N.T$^{e,f}$ | NT | NT |
| 1 | NT | 2$^a$, 15$^b$, 24.8$^c$, 41.8$^d$, 56.4$^e$, 84.2$^f$ | NT |

TABLE 2-continued

Removal (%) of pesticides in aqueous solutions at various absorbed doses.

| Initial concentrations (ppm) | Targeted pesticides | | |
|---|---|---|---|
| | Malathion (%) | Pirimiphos-Me (%) | Cypermethrin (%) |
| 2 | NT | NT | N.T$^{a,b,c}$, 0.22$^d$, 3.65$^e$, 22.1$^f$ |
| 4 | 0$^a$, 0.43$^b$, 2.73$^c$, 7.19$^d$, NT$^{e,f}$ | NT | NT |
| 8 | 0$^{a,b,c}$, 3.29$^d$, 11.97$^e$, 30.77$^f$ | NT | NT |

Absorbed dose: ($^a$150 Gy, $^b$250 Gy, $^c$500 Gy, $^d$1000 Gy, $^e$2000 Gy and $^f$7000 Gy).
NT: not targeted.

As shown in Table 2, pesticide type, initial concentration, and absorbed dose play a significant role in the pesticide removal; this was evident from the removal percentages after irradiation of pesticides in aqueous solutions. In this respect, the higher the absorbed dose the higher the pesticide removal and vice versa. In addition, data reflect the important role of a variety of reactive species (mainly hydroxyl radicals and solvated electrons) formed in irradiated aqueous solutions in the reduction yield of pesticides. Moreover, the expected removal yields of pesticide residues in selected vegetables and fruits should be decreased proportionally compared to aqueous solutions. This is due to the fact that food items contain a large number of organic substances which may compete with pesticide residues for a various reactive species generated by radiation in the selected food items matrix by radiation. This issue is important in extending bench scale aqueous solutions results to commercial irradiation of selected vegetables and fruits.

Example 3

Irradiation of Vegetables

Potatoes and Onions

Removal (%) of pesticide residues in both aqueous solutions and selected vegetables after irradiation up to 1000 Gy was measured. The results are shown in Table 3 and FIGS. 1, 2 and 5).

Figure 2:
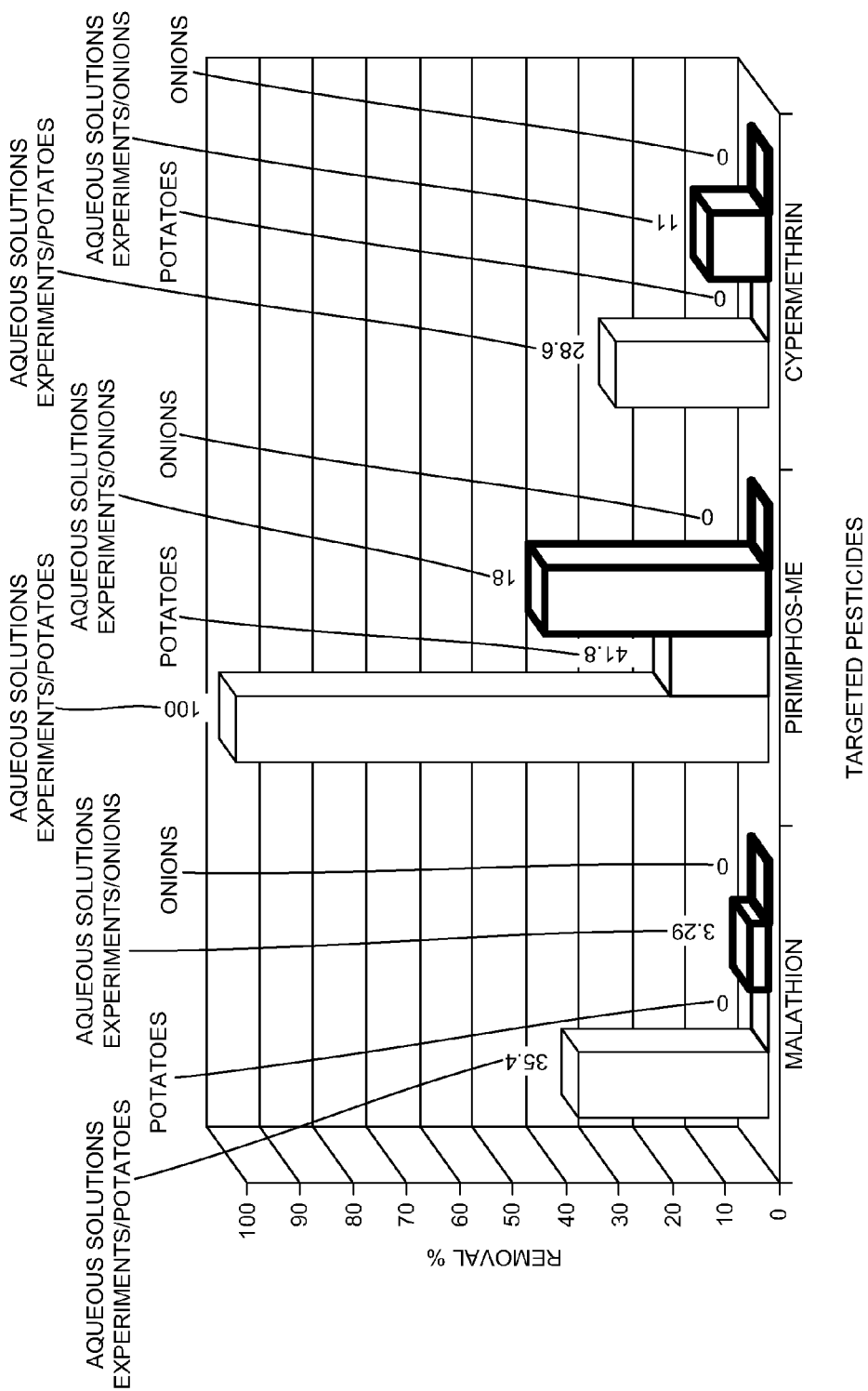
FIG. 2 shows removal (%) of cypermethrin (0.05 ppm in potatoes and 0.1 ppm in onions), pirimiphos-methyl (0.05 ppm in potatoes and 1 ppm in onions) and malathion (0.5 ppm in potato and 8 ppm in onions) in distilled water and investigated vegetables at an absorbed dose of 1000 Gy according to a method of Table 2.
Figure 5:
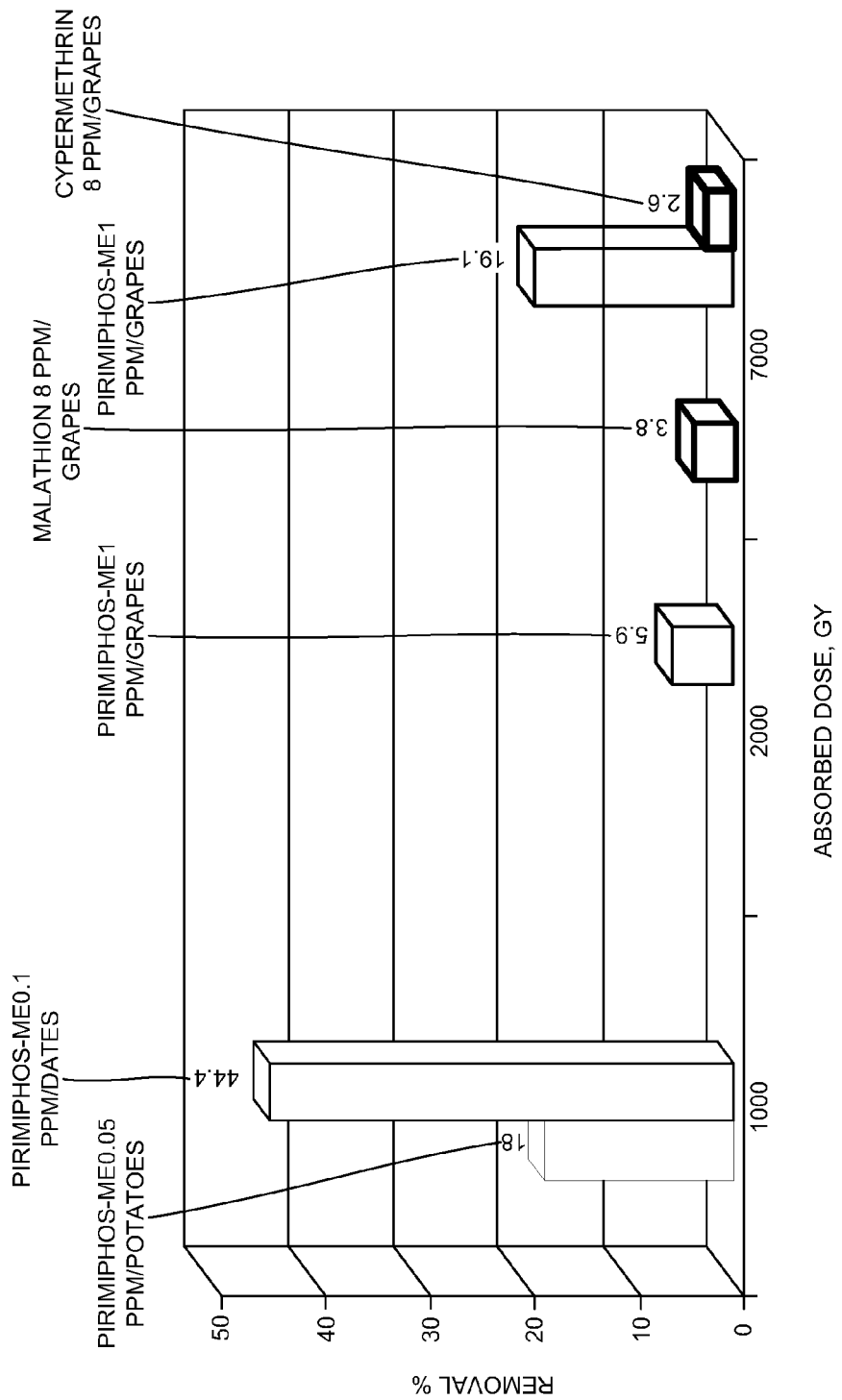
FIG. 5 shows removal (%) of targeted pesticides at selected concentrations in vegetables and fruits as a function of absorbed dose according to a method of Tables 2 and 3.

The data for removing pesticide residues of the present invention as shown in Table 3 and FIGS. 1, 2 and 5) demonstrate that the removal of pesticides is greater in irradiated aqueous solutions than in selected vegetables. The residues of the pirimiphos-methyl (0.05 ppm) in potatoes were removed by 18% with absorbed dose of 1000 Gy, whereas a removal of 100% was achieved with aqueous solution experiments at the same absorbed dose.

Moreover, no significant removal took place when irradiation was performed for onions fortified with pirimiphos-methyl (1 ppm), whereas removal of 41.8% was observed with distilled water at the absorbed dose of 1000 Gy. In this respect, no measurable removal took place when gamma irradiation was performed on potatoes and onions samples fortified with malathion (0.5 and 8 ppm) and cypermethrin (0.05 and 0.1 ppm) at the absorbed dose of 1000 Gy. On the other hand, a removal of (35.4 and 3.29%) and (28.6 and 11%) was achieved with aqueous solution at the same pesticide concentrations and absorbed dose, respectively.

TABLE 3

Removal (%) of pesticide residues in aqueous solutions and selected vegetables after irradiation up to 1 kGy.

| Pesticide type | Targeted concentration MRL (ppm) | Aqueous solutions | | Vegetables | |
|---|---|---|---|---|---|
| | | Concentration (ppm) | Removal (%) | Concentration (ppm) | Removal (%) |
| Malathion | 0.5$^P$ | 0.323 | 35.4 | NE | 0 |
| | 8$^O$ | 7.74 | 3.29 | NE | 0 |
| Pirimiphos-Me | 0.05$^P$ | BDL | 100 | 0.041 | 18 |
| | 1$^O$ | 0.582 | 41.8 | NE | 0 |
| Cypermethrin | 0.05$^P$ | 0.036 | 28.6 | NE | 0 |
| | 0.1$^O$ | 0.089 | 11 | NE | 0 |

P: potatoes.
O: onions.
BDL: below detection limit of 0.001 ppm.
NE: no effect.

Example 4

Irradiation of Fruits

Grapes and Dates

Removal (%) of pesticide residues in aqueous solutions and selected fruits after irradiation up to 7000 Gy was measured. The results are shown in Table 4 and FIGS. 3-5.

TABLE 4

Removal (%) of pesticide residues in aqueous solutions and selected fruits after irradiation up to 7 kGy.

| Pesticide type | Absorbed dose (Gy) | Targeted concentration MRL (ppm) | Aqueous solutions | | Fruits | |
|---|---|---|---|---|---|---|
| | | | Concentration (ppm) | Removal (%) | Concentration (ppm) | Removal (%) |
| Malathion | 1000 | $8^D$ | 7.74 | 3.29 | NE | 0.0 |
| | | $8^G$ | | | | |
| | 2000 | | 7.04 | 11.97 | NE | 0.0 |
| | 7000 | | 5.54 | 30.77 | 7.694 | 3.83 |
| Pirimiphos-Me | 1000 | $0.1^D$ | 0.0034 | 96.6 | 0.056 | 44.4 |
| | | $1^G$ | 0.582 | 41.8 | NE | 0.0 |
| | 2000 | | 0.436 | 56.4 | 0.941 | 5.9 |
| | 7000 | | 0.158 | 84.2 | 0.809 | 19.1 |
| Cypermethrin | 1000 | $2^G$ | 1.996 | 0.22 | NE | 0.0 |
| | 2000 | | 1.927 | 3.65 | NE | 0.0 |
| | 7000 | | 1.558 | 22.1 | 1.948 | 2.6 |

$^D$dates.
$^G$grapes.
NE: no effect.

Figure 3:
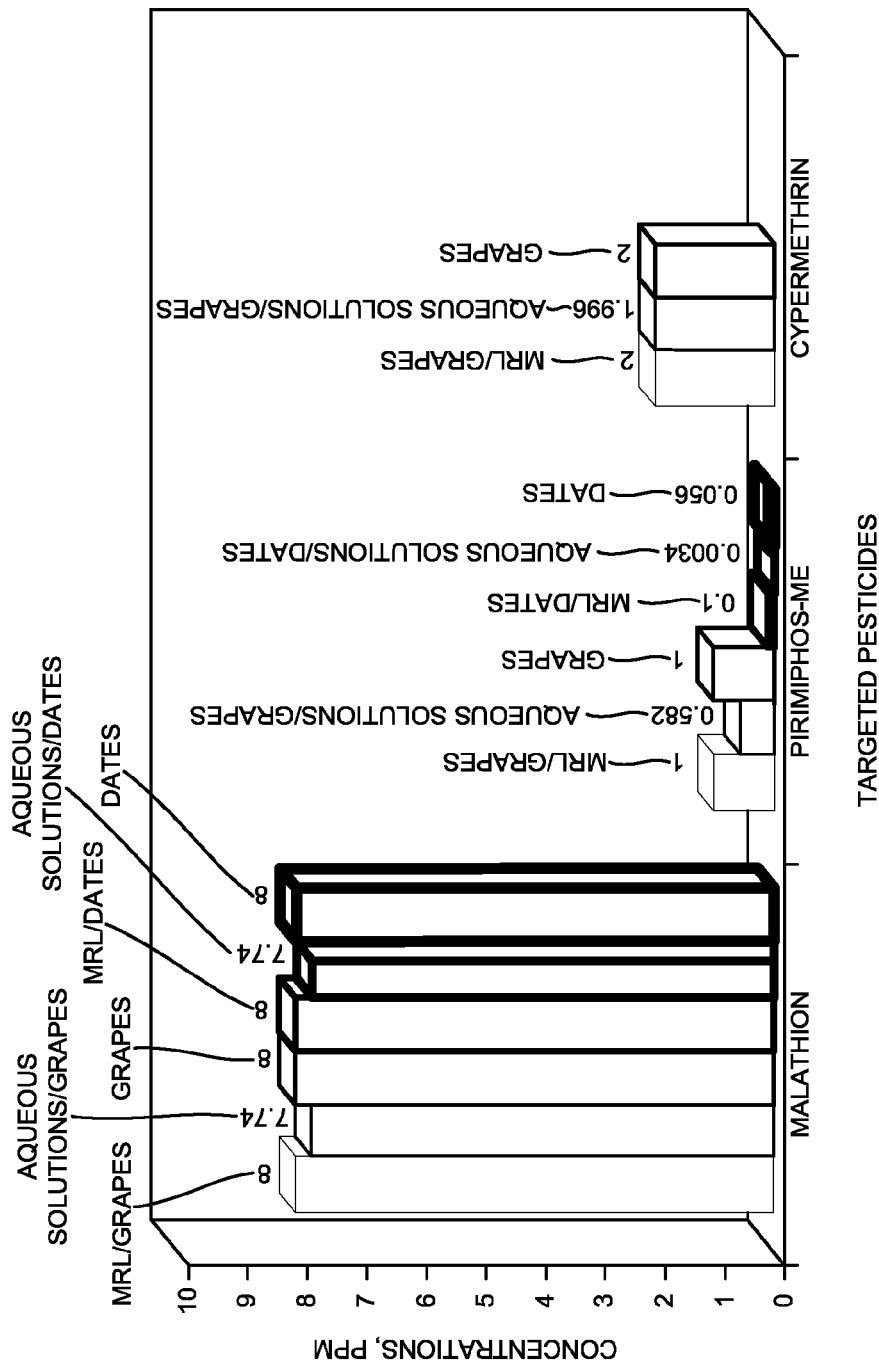
FIG. 3 shows removal rates of targeted pesticides at selected concentrations in distilled water and investigated fruits at an absorbed dose of 1000 Gy according to a method of Table 3.
Figure 4:
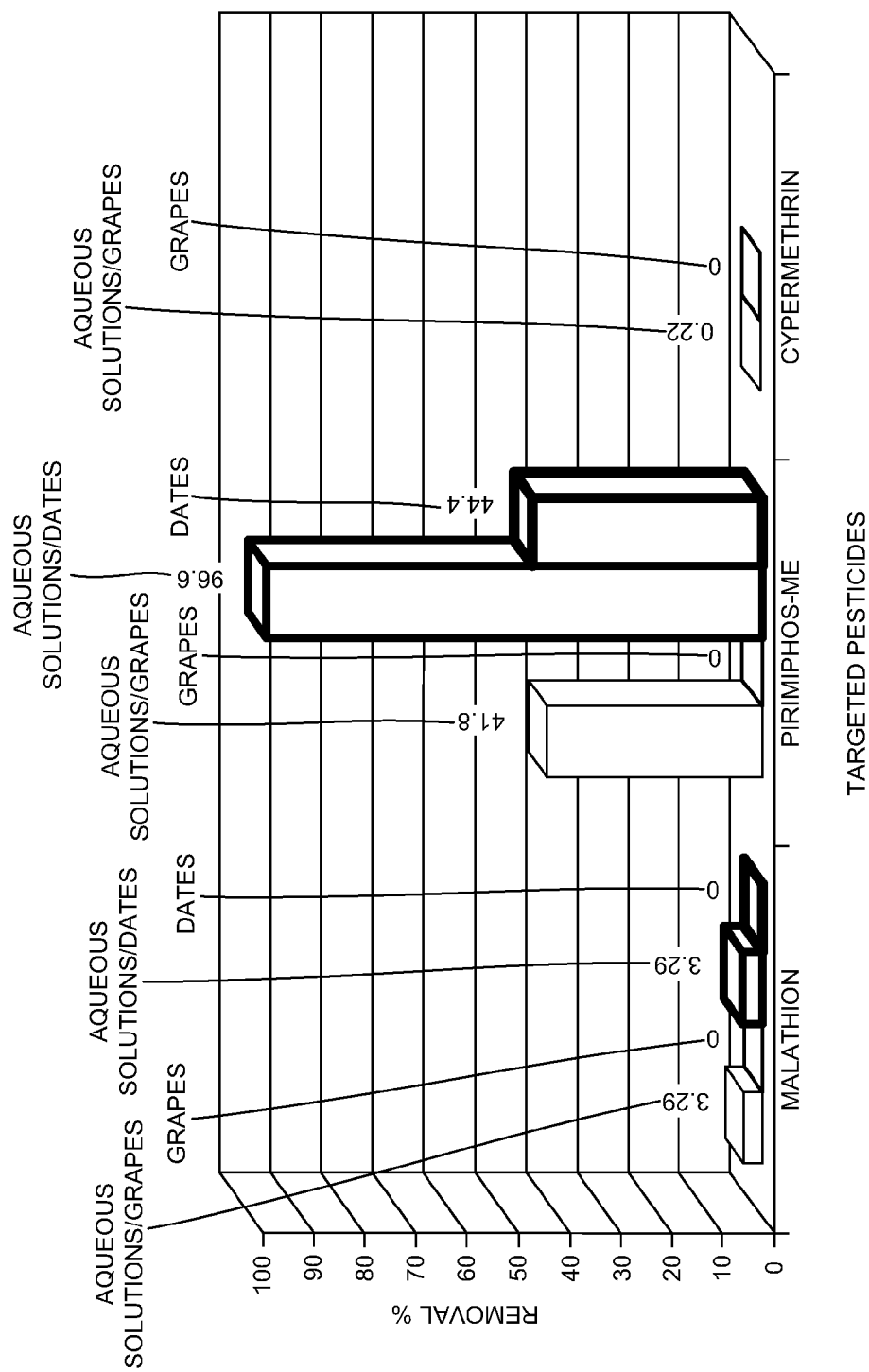
FIG. 4 shows removal (%) of cypermethrin (2 ppm in grapes), pirimiphos-methyl (1 ppm in grapes and 0.1 ppm in dates) and malathion (8 ppm in grapes and dates) in distilled water and investigated fruits at an absorbed dose of 1000 Gy according to a method of Table 3.

As shown in Table 4 and FIGS. 3-5, the removal of pesticides is greater in irradiated aqueous solutions than in selected fruits. No measurable removal took place when gamma irradiation was performed on grapes spiked with malathion (8 ppm), pirimiphos-methyl (1 ppm) and cypermethrin (2 ppm) up to 2000 Gy (malathion and cypermethrin) and 1000 Gy (pirimiphos-methyl), whereas removal of 11.97 and 3.65% and 41.8% was achieved with aqueous solution at the same absorbed doses and pesticide concentrations, respectively. Gamma radiolysis showed that the residues of the malathion (8 ppm) and cypermethrin (2 ppm) on grapes were reduced slightly with absorbed dose of 7000 Gy (7.694 ppm and 1.948 ppm with 3.83% and 2.6% removal), respectively. Accordingly, a removal of 19.1% was achieved with pirimiphos-methyl (1 ppm) with absorbed dose of 7000 Gy, whereas a removal of 84.2% was obtained with aqueous solutions. In addition, irradiation at an absorbed dose of 2000 Gy resulted in 5.9% removal for the initial 1 ppm of pirimiphos-methyl residues. Therefore, irradiation at absorbed doses of 2000 Gy (used commercially to improve grapes storability) and 7000 Gy (used commercially to increase grapes juice yield) can reduce the pesticide residues concentrations to levels below MRLs of (pirimiphos-methyl) and (malathion, pirimiphos-methyl and cypermethrin) contaminated grapes, respectively.

Aqueous solutions gamma radiolysis experiments showed that the initial concentrations of the malathion and pirimiphos-methyl (8 and 1 ppm) were removed slightly (3.29%) and moderately (41.8%) with absorbed dose of 1000 Gy, respectively. No positive removal effect when irradiation was performed on dates spiked with malathion (8 ppm) at an absorbed dose of 1000 Gy, whereas a removal of 3.29% was obtained with distilled water. In addition, irradiation at the same dose was sufficient to reduce pirimiphos-methyl residues (0.1 ppm) in contaminated dates to below MRL reaching 40.32% and 48.47% removal, respectively (Ave. 44.40%) compared with a removal of 96.6% for aqueous solutions experiment.

The differences between distilled water and real samples data is due to the fact that the various reactive species generated in investigated vegetables and fruits by radiation become less available to react with targeted pesticide residues. A large number of organic substances present in selected food items will compete with pesticides for the various reactive species generated by radiation in the targeted vegetables and fruits matrix. Thus, the removal yields obtained for pesticides in aqueous solutions were higher than those obtained in complex matrices of targeted vegetables and fruits.

As mentioned in Examples 3 and 4 above, ionizing radiation can reduce the residues of pirimiphos-methyl (in potatoes, grapes and dates); malathion and cypermethrin (in grapes) to below maximum residue limits (MRLs).

Although the present embodiments have been described with reference to specific example embodiments, it will be evident that various modifications and changes may be made to these embodiments without departing from the broader spirit and scope of the various embodiments. Accordingly, the specification and examples are to be regarded in a descriptive rather than a restrictive sense.

What is claimed is:

1. A process, comprising:
   treating an organic material, wherein the organic material is vegetables (potatoes and onions) and/or fruits (dates, and grapes), with a pesticide to reduce a concentration of the pesticide in the organic material;
   irradiating the organic material by an ionizing radiation to reducing a level of the pesticide to meet an acceptable level by a standard authority; and
   measuring the level of the pesticide after a gamma irradiation.

2. The process of claim 1, further comprising:
   removing a malathion pesticide in the potatoes by the ionizing radiation at an absorbed dose of 1000 Gy, wherein the malathion pesticide in concentration of 0.5 ppm.

3. The process of claim 1, further comprising:
   removing a pirimiphos-methyl pesticide in the potatoes by the ionizing radiation at an absorbed dose of 1000 Gy, wherein the pirimiphos-methyl pesticide in concentration of 0.05 ppm.

4. The process of claim 1, further comprising:
   removing a cypermethrin pesticide in the potatoes by the ionizing radiation at an absorbed dose of 1000 Gy, wherein the cypermethrin pesticide in concentration of 0.05 ppm.

5. The process of claim 1, further comprising:
   removing a malathion pesticide in the onions by the ionizing radiation at an absorbed dose of 1000 Gy, wherein the malathion pesticide in concentration of 8 ppm.

6. The process of claim 1, further comprising:
removing a pirimiphos-methyl pesticide in the onions by the ionizing radiation at an absorbed dose of 1000 Gy, wherein the pirimiphos-methyl pesticide in concentration of 1 ppm.

7. The process of claim 1, further comprising:
removing a cypermethrin pesticide in the onions by the ionizing radiation at an absorbed dose of 1000 Gy, wherein the cypermethrin pesticide in concentration of 0.1 ppm.

8. The process of claim 1, further comprising:
removing a malathion pesticide in the dates by the ionizing radiation at an absorbed dose of 1000 Gy, wherein the malathion pesticide in concentration of 8 ppm.

9. The process of claim 1, further comprising:
removing a pirimiphos-methyl pesticide in the dates by the ionizing radiation at an absorbed dose of 1000 Gy, wherein the pirimiphos-methyl pesticide in concentration of 0.1 ppm.

10. The process of claim 1, further comprising:

removing a malathion pesticide in the grapes by the ionizing radiation at absorbed doses of 1000, 2000 and 7000 Gy, wherein the malathion pesticide in concentration of 8 ppm.

11. The process of claim 1, further comprising:

removing a pirimiphos-methyl pesticide in the grapes by the ionizing radiation at an absorbed dose of 1000, 2000 and 7000 Gy, wherein the pirimiphos-methyl pesticide in concentration of 1 ppm.

12. The process of claim 1, further comprising:

removing a cypermethrin pesticide in the grapes by the ionizing radiation at an absorbed dose of 1000, 2000 and 7000 Gy, wherein the cypermethrin pesticide in concentration of 2 ppm.

* * * * *